(12) United States Patent
Fujimoto et al.

(10) Patent No.: US 10,862,405 B2
(45) Date of Patent: Dec. 8, 2020

(54) METHOD OF DRIVING VIBRATION DEVICE AND VIBRATION DEVICE

(71) Applicant: Murata Manufacturing Co., Ltd., Nagaokakyo (JP)

(72) Inventors: Katsumi Fujimoto, Nagaokakyo (JP); Chikahiro Horiguchi, Nagaokakyo (JP); Yasuhiro Kuratani, Nagaokakyo (JP); Satoshi Ichihara, Nagaokakyo (JP); Kiyoyuki Miyazawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/733,258

(22) Filed: Jan. 3, 2020

(65) Prior Publication Data

US 2020/0144939 A1    May 7, 2020

Related U.S. Application Data

(63) Continuation of application No. PCT/JP2018/015236, filed on Apr. 11, 2018.

(30) Foreign Application Priority Data

Aug. 9, 2017    (JP) .................. 2017-154334

(51) Int. Cl.
*H02N 2/06*    (2006.01)
*G03B 17/08*    (2006.01)
(Continued)

(52) U.S. Cl.
CPC ............. *H02N 2/026* (2013.01); *G03B 17/08* (2013.01); *G03B 17/56* (2013.01); *H04N 5/225* (2013.01)

(58) Field of Classification Search
CPC ........ H02N 2/026; G03B 17/08; G03B 17/56; H04N 5/225
See application file for complete search history.

(56) References Cited

U.S. PATENT DOCUMENTS 8,980,010 B2 * 3/2015 Ifuku ................. G02B 27/0006
134/1
2012/0032557 A1    2/2012 Furuta et al.

FOREIGN PATENT DOCUMENTS

JP    08-183428 A    7/1996
JP    2012-039754 A    2/2012
(Continued)

OTHER PUBLICATIONS

Official Communication issued in International Patent Application No. PCT/JP2018/015236, dated Jun. 12, 2018.

*Primary Examiner* — Minh Q Phan
(74) *Attorney, Agent, or Firm* — Keating & Bennett, LLP

(57) ABSTRACT

A method of driving a vibration device including a light-transmitting body and a piezoelectric element connected to the light-transmitting body is provided to vibrate the light-transmitting body. The method atomizes and removes liquid drops sticking to the light-transmitting body. A driving voltage to vibrate the piezoelectric element is swept at a sweep speed in a range of about 1 Hz to about 50 Hz so as to sweep a vibration frequency of the piezoelectric element to cover a frequency range including both of a resonant frequency of the light-transmitting body without liquid drops sticking to the light-transmitting body and a resonant frequency of the light-transmitting body with the liquid drops sticking to the light-transmitting body.

15 Claims, 11 Drawing Sheets

(51) Int. Cl.
G03B 17/56 (2006.01)
H04N 5/225 (2006.01)
H02N 2/02 (2006.01)

(56) References Cited

FOREIGN PATENT DOCUMENTS

| | | |
|---|---|---|
| JP | 2012-138768 A | 7/2012 |
| JP | 2013-080177 A | 5/2013 |
| JP | 2017-085276 A | 5/2017 |

* cited by examiner

METHOD OF DRIVING VIBRATION DEVICE AND VIBRATION DEVICE

CROSS REFERENCE TO RELATED APPLICATIONS

This application claims the benefit of priority to Japanese Patent Application No. 2017-154334 filed on Aug. 9, 2017 and is a Continuation Application of PCT Application No. PCT/JP2018/015236 filed on Apr. 11, 2018. The entire contents of each application are hereby incorporated herein by reference.

BACKGROUND OF THE INVENTION

1. Field of the Invention

The present invention relates to a method of driving a vibration device having a function of removing liquid drops, such as water drops, and to the vibration device.

2. Description of the Related Art

Japanese Unexamined Patent Application Publication No. 2012-138768 discloses a camera having a function of removing raindrops. In this camera, a translucent or transparent dome-shaped cover is disposed in front of a camera body. A hollow cylinder is connected to the dome-shaped cover, and a piezoelectric ceramics vibrator is fixed to the hollow cylinder. When water drops, such as raindrops, have stuck to the dome-shaped cover, the piezoelectric vibrator vibrates the hollow cylinder and the dome-shaped cover. The vibration atomizes and removes water drops. When water drops are removed, vibration at or around the resonant frequency of the dome-shaped cover can efficiently remove water drops.

In Japanese Unexamined Patent Application Publication No. 2012-138768, when the piezoelectric vibrator is driven, the frequency of an alternating current voltage is increased to the maximum frequency and then swept around resonant frequencies while the frequency is being decreased. Japanese Unexamined Patent Application Publication No. 2012-138768 discloses a Pattern A in which the frequency is swept with a sawtooth waveform and a Pattern B in which the frequency is increased to the maximum frequency and then swept around a plurality of resonant frequencies in descending order of frequency while the frequency is being decreased.

The driving method described in Japanese Unexamined Patent Application Publication No. 2012-138768 has limits to the sweep range in which the frequency is swept. If an amplitude minimum exists even at the frequency lower limit, water drops or the like may remain. Accordingly, the frequency is repeatedly swept to obtain a sawtooth change in Pattern A, and the sweep range is widened by using a plurality of resonance points in Pattern B.

However, water drops sometimes spread in the form of a liquid film and obstruct the field of view of the camera during a process of vibrating the dome-shaped cover to remove water drops.

SUMMARY OF THE INVENTION

Preferred embodiments of the present invention provide methods of driving vibration devices and vibration devices. The methods and the devices are unlikely to suffer from obstruction of the field of view due to a spreading liquid film while liquid drops sticking to a light-transmitting body are removed.

A preferred embodiment of the present invention provides a method of driving a vibration device including a light-transmitting body and a piezoelectric element connected to the light-transmitting body so as to vibrate the light-transmitting body. The method atomizes and removes liquid drops sticking to the light-transmitting body. A driving voltage to vibrate the piezoelectric element is swept at a sweep speed in a range of about 1 Hz to about 50 Hz so as to sweep a vibration frequency of the piezoelectric element to cover a frequency range including both of a resonant frequency of the light-transmitting body without liquid drops sticking to the light-transmitting body and a resonant frequency of the light-transmitting body with the liquid drops sticking to the light-transmitting body.

In a method of driving a vibration device according to a preferred embodiment of the present invention, a procedure of sweeping in the frequency range includes a step of increasing a sweep voltage and a step of decreasing the sweep voltage after the step of increasing the sweep voltage, and an increase and a decrease in the sweep voltage are performed in a continuous manner.

In a method of driving a vibration device according to a preferred embodiment of the present invention, a first step in which the piezoelectric element is driven so as to atomize liquid drops sticking to the light-transmitting body, a second step in which the light-transmitting body is caused to vibrate more weakly than in the first step or caused to stop vibrating, and a third step, which follows the second step, to atomize liquid drops sticking to the light-transmitting body are performed by a sweep in the frequency range.

A vibration device according to a preferred embodiment of the present invention includes a light-transmitting body, a piezoelectric element that is connected to the light-transmitting body and that vibrates the light-transmitting body, and a control circuit that is electrically connected to the piezoelectric element and that sweeps at a speed in a range of about 1 Hz to about 50 Hz a driving voltage to vibrate the piezoelectric element so as to sweep a vibration frequency of the piezoelectric element to cover a frequency range including a resonant frequency of the light-transmitting body and a resonant frequency of the light-transmitting body with liquid drops sticking to the light-transmitting body.

In a vibration device according to a preferred embodiment of the present invention, the vibration device further includes a hollow cylindrical body connecting the light-transmitting body to the piezoelectric element. The piezoelectric element has a ring shape. The piezoelectric element having the ring shape is fixed to one end of the hollow cylindrical body, and the light-transmitting body is fixed to the other end of the hollow cylindrical body.

According to the vibration-device driving methods and the vibration devices of preferred embodiments of the present invention, while liquid drops sticking to a light-transmitting body are atomized and removed, a liquid film is unlikely to spread on the surface of the light-transmitting body. Thus, when the light-transmitting body is used for the cover or the like of a camera, obstruction of the field of view is unlikely to occur.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, specific preferred embodiments of the present invention will be described in detail with reference to the drawings, and the present invention will be disclosed.

It is to be noted that the preferred embodiments are described in the specification for illustrative purposes and that partial substitutions or combinations of configurations are possible in different preferred embodiments.

Figure 1:
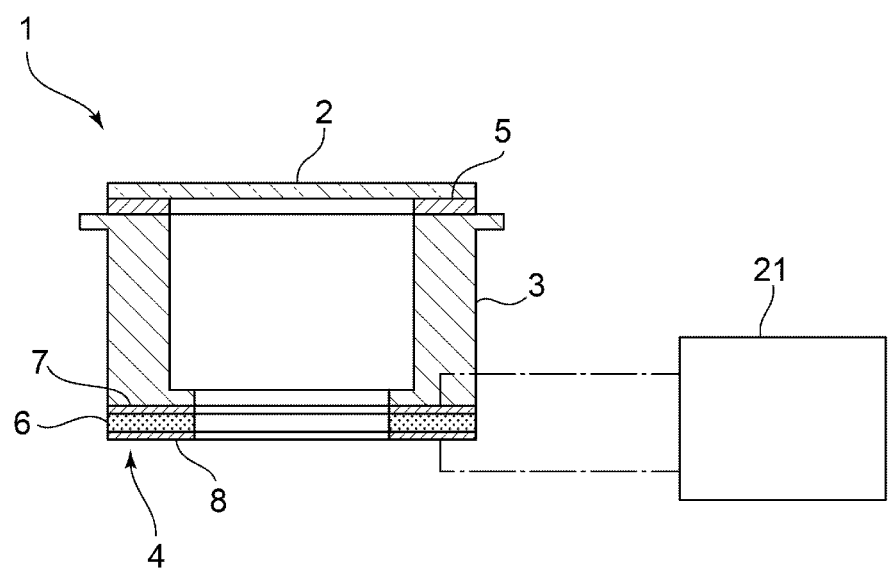
FIG. 1 is a simplified front elevational cross-sectional view of a vibration device according to a first preferred embodiment of the present invention.
Figure 2:
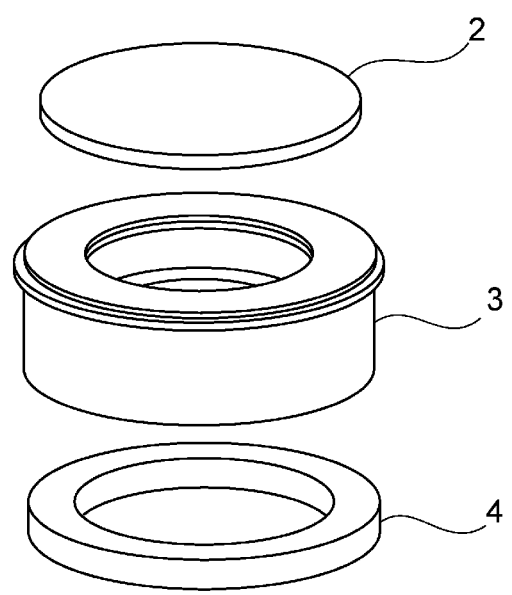
FIG. 2 is an exploded perspective view of a vibrating portion of the vibration device according to a preferred embodiment of the present invention.

FIG. 1 is a simplified front elevational cross-sectional view of a vibration device according to a first preferred embodiment of the present invention, and FIG. 2 is an exploded perspective view depicting a vibrating portion of the vibration device.

A vibration device 1 includes a light-transmitting body 2 that is translucent or transparent, a hollow cylindrical body 3, and a piezoelectric element 4. The hollow cylindrical body 3 is hollow and has a cylindrical or substantially cylindrical shape. The light-transmitting body 2, which has a plate shape, is fixed to the hollow cylindrical body 3 so as to close an opening at one end of the hollow cylindrical body 3. The light-transmitting body 2 is made of a translucent or transparent material, such as resin or glass, for example. The light-transmitting body 2 is preferably transparent.

The light-transmitting body 2 is fixed to the hollow cylindrical body 3 with a bonding agent layer 5 interposed therebetween.

The piezoelectric element 4 has a ring shape. The piezoelectric element 4 includes a ring-shaped piezoelectric member 6. The ring-shaped piezoelectric member 6 is preferably made of piezoelectric ceramics and has been subjected to poling treatment in the thickness direction. A first electrode 7 is disposed on one surface of the ring-shaped piezoelectric member 6, and a second electrode 8 is disposed on the other surface.

Figure 3:
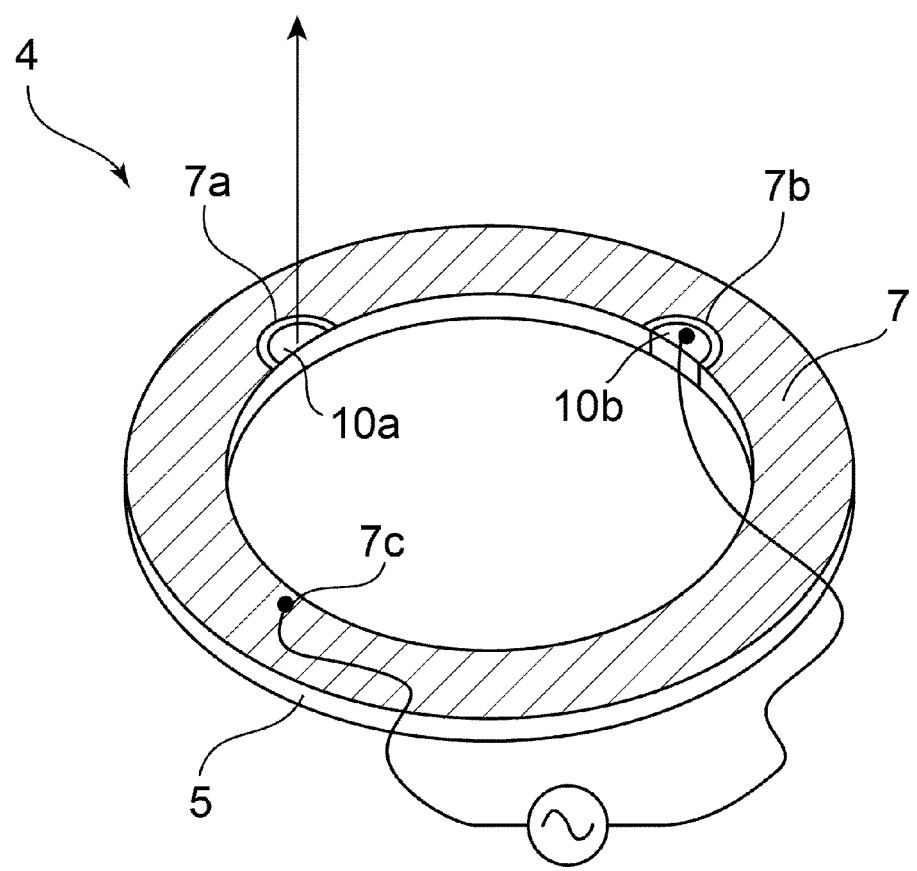
FIG. 3 is a perspective view of a piezoelectric element used in the vibration device according to the first preferred embodiment of the present invention.

As shown in FIG. 3, the first electrode 7 includes cutouts 7a and 7b. The cutouts 7a and 7b face the inner perimeter of the ring on one surface of the ring-shaped piezoelectric member 6. An electrode 10a, which is independent of the first electrode 7, is disposed inside the cutout 7a. The electrode 10a defines and functions as a feedback electrode to monitor a voltage generated by a piezoelectric effect during vibration. An electrode 10b is disposed inside the cutout 7b. The electrode 10b is electrically connected to the second electrode 8 via a portion of the inner perimeter of the ring-shaped piezoelectric member 6. An electrode section 7c is a portion of the first electrode 7, and an alternating current voltage is applied between the electrode 10b and the electrode section 7c to excite vibration. If a current measurement circuit described below is unnecessary, the electrode 10a, which defines and functions as a feedback electrode, may be omitted.

Applying an alternating current voltage between the first electrode 7 and the second electrode 8 causes the piezoelectric element 4 to vibrate. The vibration of the piezoelectric element 4 propagates to the hollow cylindrical body 3, and the light-transmitting body 2 vibrates together with the hollow cylindrical body 3.

If a liquid drop, such as a water drop, for example, sticks to the light-transmitting body 2, the vibration can move the water drop and remove the water drop by atomization.

Figure 4A:
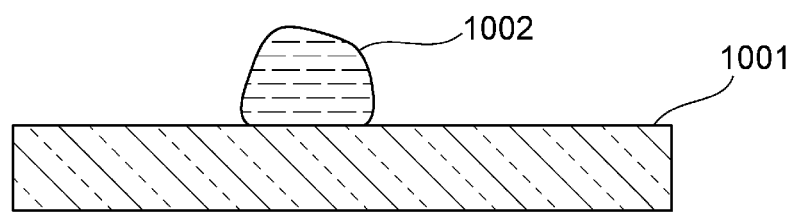
FIGS. 4A to 4C are schematic front elevational cross-sectional views showing a procedure of removing water drops in the related art.
Figure 4B:
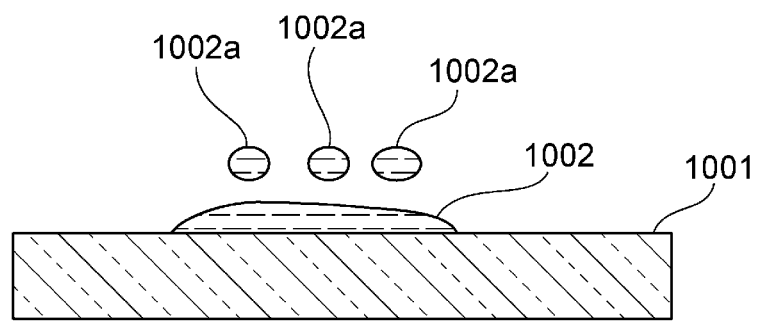
Figure 4C:
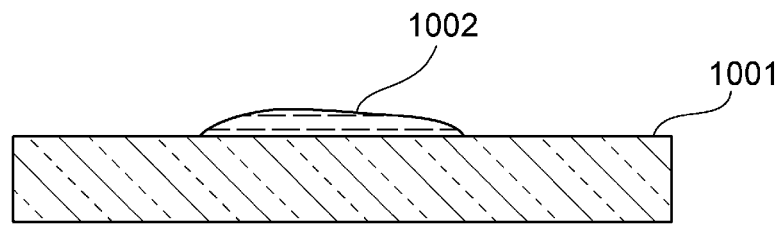

FIGS. 4A to 4C are schematic front elevational cross-sectional views showing a procedure of removing water drops by using such a known vibration device as is disclosed in Japanese Unexamined Patent Application Publication No. 2012-138768.

FIG. 4A represents a state in which a liquid drop 1002 sticks on a light-transmitting body 1001. When the light-transmitting body 1001 is vibrated in this state in a known vibration device, the light-transmitting body 1001 is vibrated at or around a resonant frequency. Consequently, as depicted in FIG. 4B, droplets 1002a, 1002a, and 1002a are dispersed and atomized from the liquid drop 1002, and a portion of the liquid drop 1002 is removed. In this case, since the liquid drop 1002 is subjected to vibration, the surface tension of the liquid drop 1002 is reduced on the surface of the light-transmitting body 1001, and the liquid drop 1002 spreads in the form of a liquid film. If vibration used for atomization continues to be applied, as depicted in FIG. 4C, the liquid drop 1002 spreads in the form of a liquid film. If further vibration is applied, the liquid drop 1002 can be removed by atomization. However, as depicted in FIG. 4C, the liquid drop 1002 sticks and spreads in the form of a liquid film during the atomization procedure. Thus, a problem of obstructing the field of view of the camera arises.

In a driving method according to the first preferred embodiment of the present invention, a first step, a second step, and a third step below are performed to sweep a driving voltage described below.

FIGS. 5A to 5D are schematic front elevational cross-sectional views showing a procedure of removing liquid drops by the driving method according to the first preferred embodiment of the present invention.

Figure 5A:
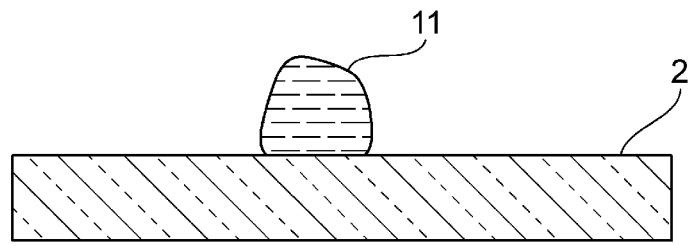
FIGS. 5A to 5D are schematic front elevational cross-sectional views showing a procedure of atomizing liquid drops in a vibration-device driving method according to a preferred embodiment of the present invention.
Figure 5B:
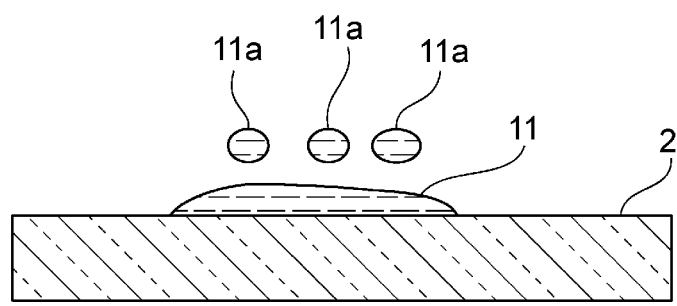

As depicted in FIG. 5A, a liquid drop 11 sticks on the light-transmitting body 2. Next, the vibration device is driven as the first step. As depicted in FIG. 5B, the liquid drop 11 spreads and a portion of the liquid drop 11 is removed in the form of droplets 11a, 11a, and 11a in the first step.

Figure 5C:
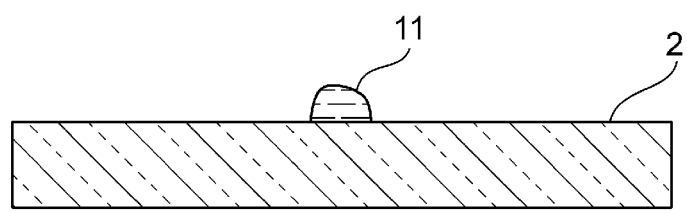

In the driving method according to the present preferred embodiment, the driving voltage is swept to atomize and remove liquid drops preferably at a sweep speed in the range of about 1 Hz to about 50 Hz, for example, so as to cover a frequency range including both of the resonant frequency of the light-transmitting body without liquid drops sticking to the light-transmitting body 2 and the resonant frequency of the light-transmitting body with liquid drops sticking to the light-transmitting body 2. Since the driving voltage is swept in this way, the second step in which the light-transmitting body 2 vibrates more weakly than in the first step is performed after the first step. In the second step, as depicted in FIG. 5C, the liquid drop 11, a portion of which has been atomized and whose volume has been reduced, is restored to a spherical shape because of the surface tension and has a certain thickness again on the surface of the light-transmitting body 2. In the second step, the light-transmitting body 2 is caused to vibrate more weakly than in the first step, which means that the light-transmitting body 2 is caused to vibrate in a manner such that the amplitude and the intensity of vibration of the light-transmitting body 2 are reduced. Alternatively, the vibration of the light-transmitting body 2 may be stopped in the second step.

Figure 5D:
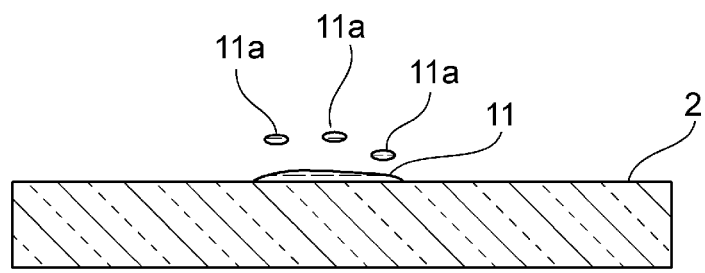
Figure 6A:
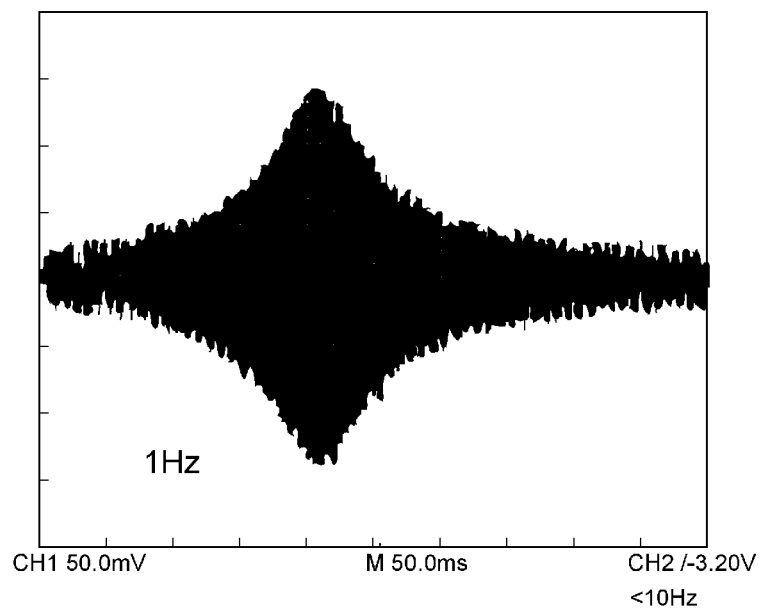
FIGS. 6A and 6B show a change in an amount of displacement of a light-transmitting body when sweep speeds are about 1 Hz and about 5 Hz, respectively.
Figure 6B:
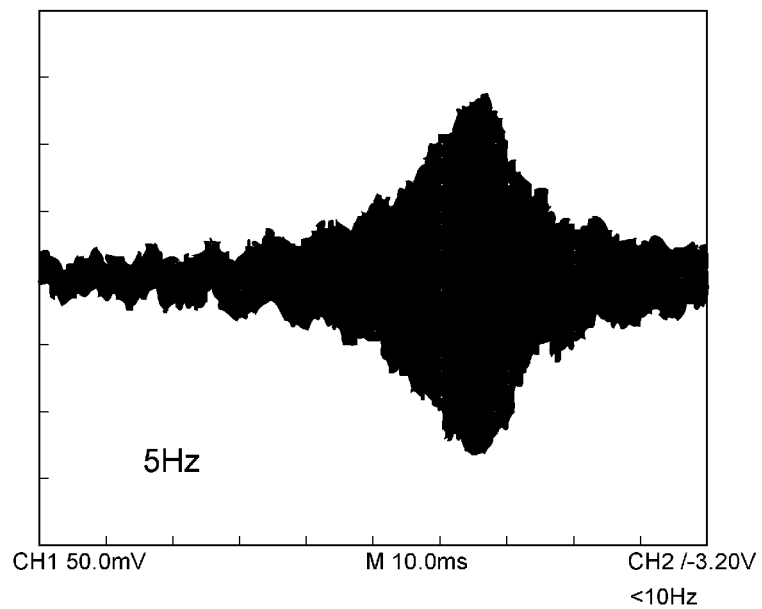
Figure 7A:
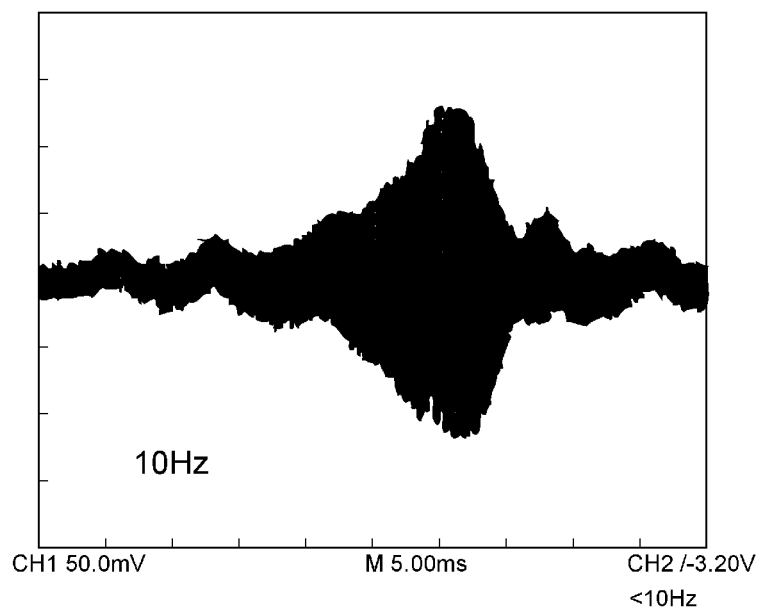
FIGS. 7A and 7B show a change in an amount of displacement of the light-transmitting body when the sweep speeds are about 10 Hz and about 20 Hz, respectively.
Figure 7B:
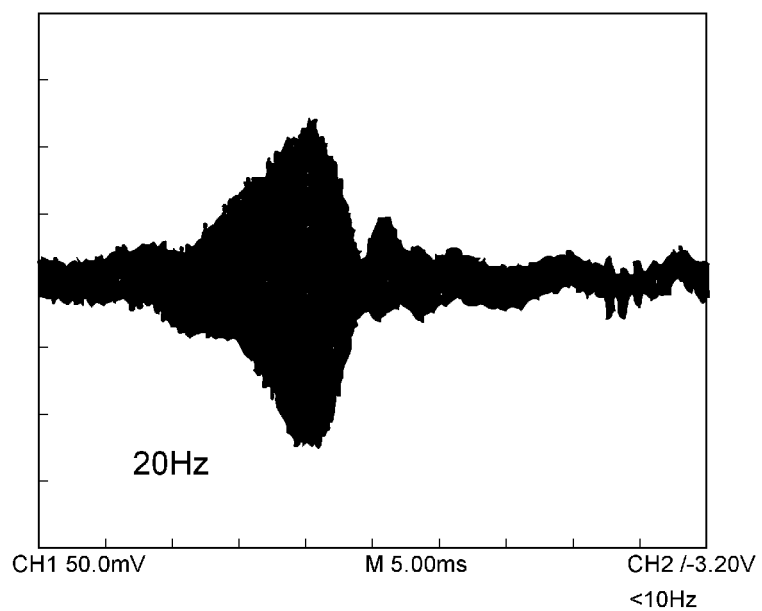

Subsequently, the light-transmitting body 2 is vibrated more strongly in the third step than in the second step. Namely, further continuation of the sweep advances atomization, as depicted in FIG. 5D. Thus, the liquid drop 11 is removed in the end.

Thus, as depicted in FIG. 5C, according to the vibration-device driving method in the present preferred embodiment, the liquid drop 11 is unlikely to stick to the light-transmitting body 2 in the form of a liquid film during the procedure of atomization. Thus, obstruction of the field of view of the camera is unlikely to occur.

As described above, the vibration-device driving method according to the present preferred embodiment includes sweeping in the above frequency range at a sweep speed in the range of about 1 Hz to about 50 Hz, for example. This feature will be described with reference to FIGS. 6A and 6B, FIGS. 7A and 7B, and FIG. 8.

FIGS. 6A and 6B, FIGS. 7A and 7B, and FIG. 8 show a temporal change in a displacement signal, which is equivalent to the amount of displacement of the light-transmitting body 2, at sweep speeds of about 1 Hz, about 5 Hz, about 10 Hz, about 20 Hz, and about 100 Hz, respectively.

As shown in FIGS. 6A to 8, a sufficient amount of displacement can be obtained at sweep speeds of about 1 Hz and about 5 Hz, and a distinct peak of displacement occurs.

Figure 8:
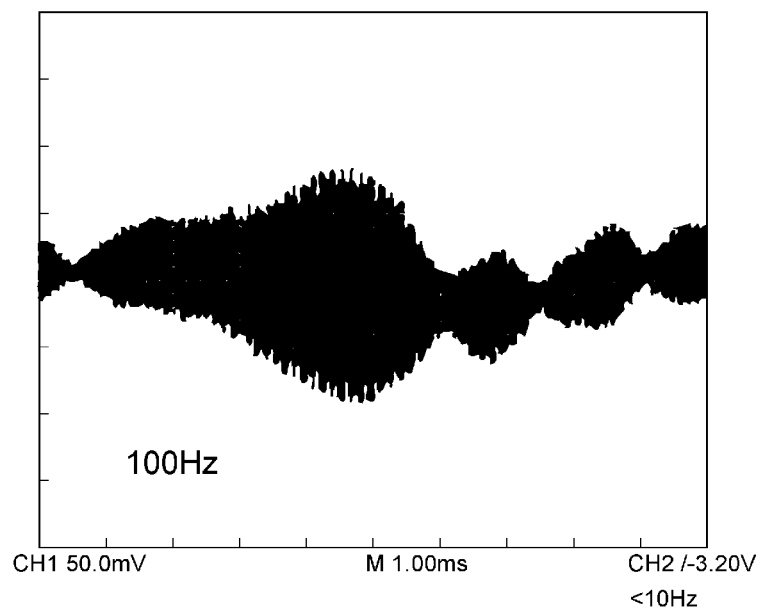
FIG. 8 shows a change in an amount of displacement of the light-transmitting body when the sweep speed is about 100 Hz.

In contrast, as the sweep speed increases, the amount of displacement decreases. As depicted in FIG. 8, the frequency at which the maximum amplitude appears changes at about 100 Hz, and it can be seen that a next resonance appears before liquid drops are restored to their original shapes.

Similarly to FIGS. 6A to 8 above, the sweep speed is varied, and the amount of time used for atomization is obtained. The horizontal axis in FIG. 10 represents a frequency, which is equivalent to a sweep speed, and the vertical axis represents the amount of time used to remove a water drop having a volume of about 5 µl as a liquid drop.

Figure 10:
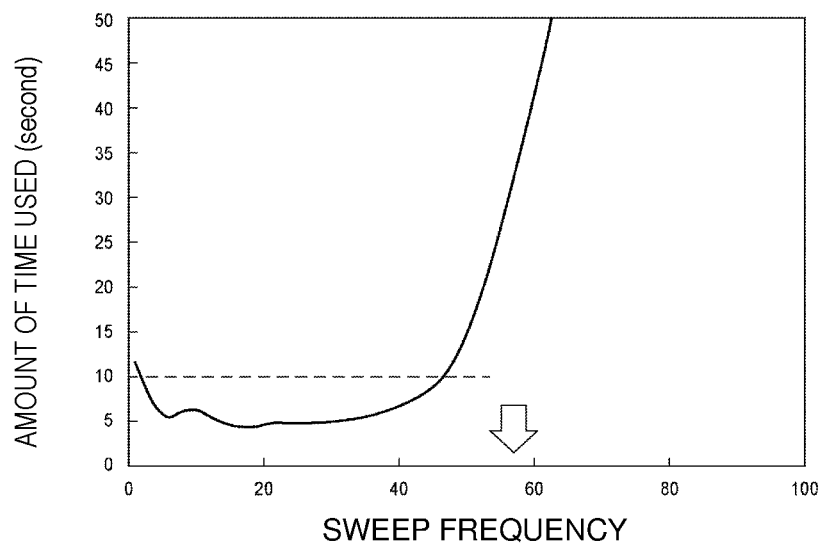
FIG. 10 shows a relationship between the sweep frequency and an amount of time used for atomization.

As is evident from FIG. 10, if the sweep speed, which is equivalent to the sweep frequency, exceeds about 50 Hz, the amount of time used for atomization rapidly increases. In addition, FIG. 10 indicates that the amount of time used for atomization is equal to about 10 seconds or less and water drops can be efficiently atomized if the sweep frequency is in the range of about 1 Hz to about 50 Hz, for example.

Figure 9:
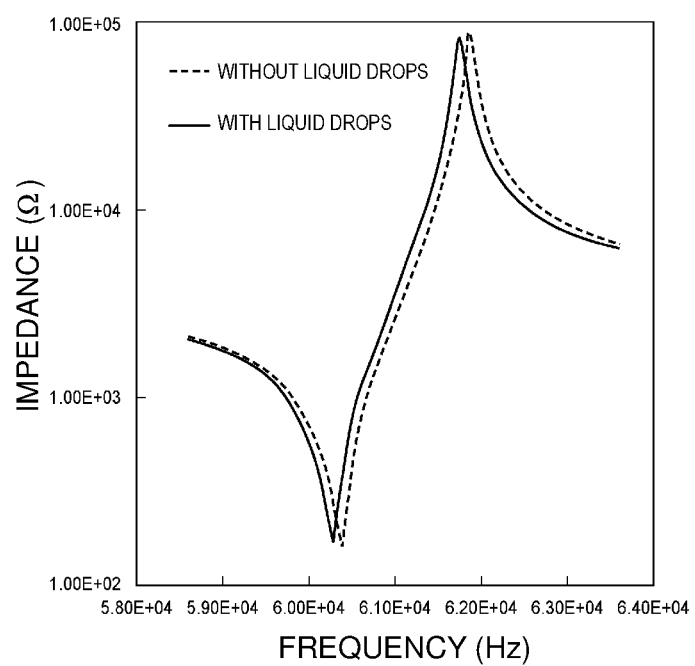
FIG. 9 shows resonance characteristics of the light-transmitting body with and without liquid drops sticking to the light-transmitting body.

FIG. 9 shows resonance characteristics of the light-transmitting body 2 with and without liquid drops sticking to the light-transmitting body 2. As shown in FIG. 9, the resonant frequencies of the light-transmitting body 2 with and without sticking liquid drops are different.

Thus, in the present preferred embodiment, the driving voltage is swept to vibrate the piezoelectric element 4 at a sweep speed in the range of about 1 Hz to about 50 Hz as described above so as to cover a frequency range including both of the resonant frequency of the light-transmitting body 2 without liquid drops sticking to the light-transmitting body 2 and the resonant frequency of the light-transmitting body 2 with liquid drops sticking to the light-transmitting body 2. In this way, liquid drops can be quickly atomized as described above.

The vibration device is driven as described above, and the atomization procedure is performed in three steps. In the first step, the piezoelectric element is driven so as to atomize liquid drops sticking to the light-transmitting body. In the second step, the light-transmitting body 2 is caused to vibrate more weakly than in the first step or caused to stop vibrating. In the third step, which follows the second step, the light-transmitting body 2 is caused to vibrate more strongly than in the second step, and liquid drops sticking to the light-transmitting body 2 are atomized again. Accordingly, as depicted in FIG. 5C above, liquid drops are unlikely to spread in the form of a liquid film on the surface of the light-transmitting body 2 in the second step, and the field of view or the like of the camera is also unlikely to be obstructed.

The vibration device 1 shown in FIG. 1 includes a driving circuit 21 to perform the driving method described above.

Figure 11:
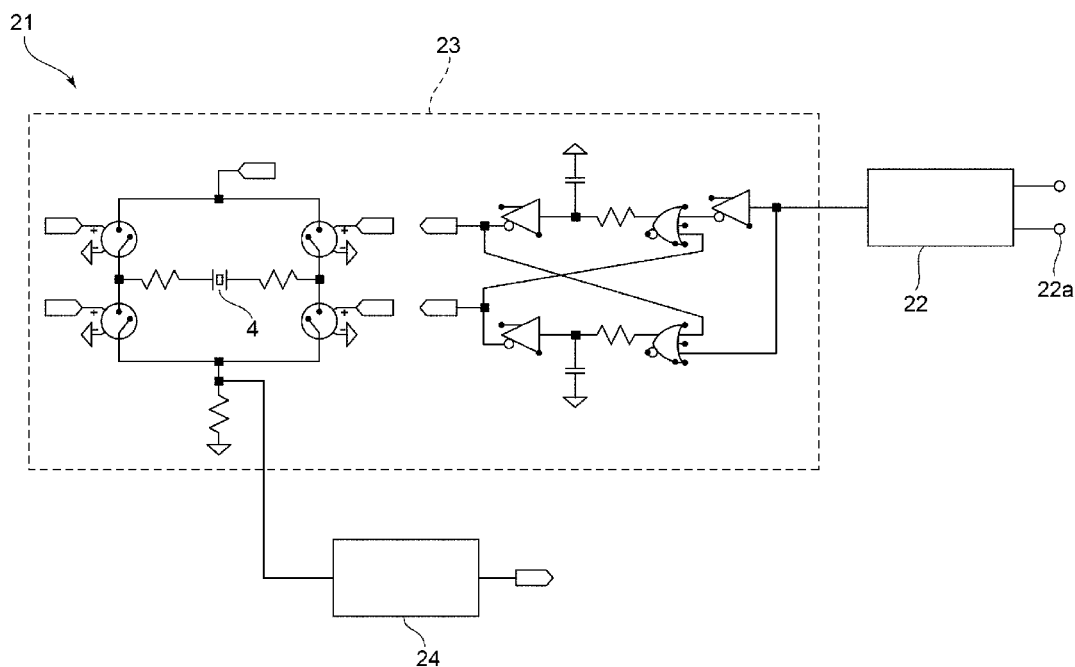
FIG. 11 is a circuit diagram showing a vibration-device driving circuit according to the first preferred embodiment of the present invention.

FIG. 11 is a circuit diagram showing an example of the driving circuit 21. The driving circuit 21 includes a voltage-controlled oscillator (VCO) 22, a driver circuit segment 23, and a current measurement circuit 24. Changing a control voltage applied to control terminals 22a of the VCO 22 causes the VCO 22 to transmit a predetermined voltage signal to the driver circuit segment 23.

The driver circuit segment 23 drives the piezoelectric element 4 at the above-described sweep speed so as to sweep in a predetermined frequency range. The current measurement circuit 24 measures a current flowing through the piezoelectric element 4 and outputs a voltage in accordance with a value of the current.

Figure 12:
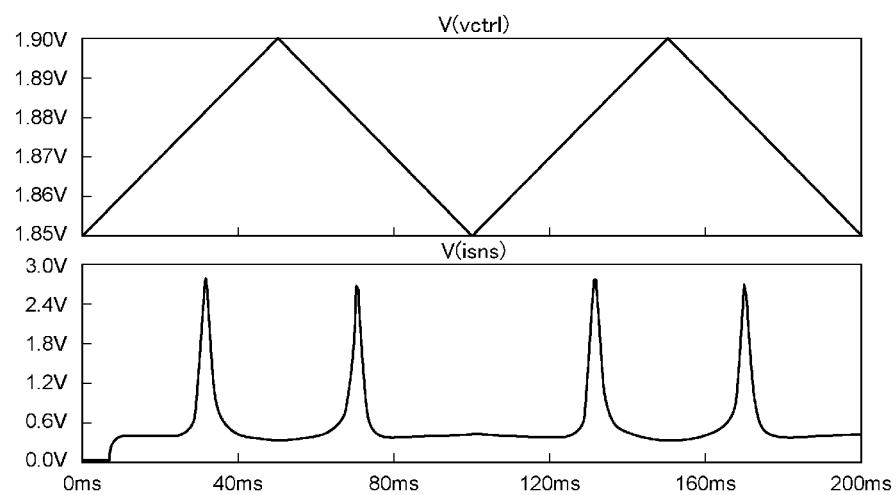
FIG. 12 shows a waveform of a driving voltage that is input to a voltage-controlled oscillator (VCO) and a waveform of a magnetic force current applied to the piezoelectric element.

The upper graph in FIG. 12 represents a voltage waveform that is input to the VCO 22. The lower graph in FIG. 12 represents a change in a current measured by the current measurement circuit 24.

Although a current value is measured by the current measurement circuit, a voltage to which the current value is converted is presented in the lower portion of FIG. 12.

As shown in FIG. 12, the driving voltage is continuously increased, for example, from about 1.85 V to about 1.90 V, and thereafter continuously decreased from about 1.90 V to about 1.85 V. The sweep is repeated by repeating the increase and decrease.

As shown in FIG. 12, in preferred embodiments of the present invention, the procedure of sweeping the frequency from the lower limit to the upper limit in the frequency sweep range preferably includes a step of increasing the sweep voltage and a step of decreasing the sweep voltage after the step of increasing the sweep voltage, and the increase and decrease in the sweep voltage are preferably performed in a continuous manner rather than in a stepwise manner. In this case, since the change in voltage is gradual, and ringing is unlikely to occur. Accordingly, the efficiency of vibration used for atomization can be improved. In other words, as shown in the upper portion of FIG. 12, the input voltage to the VCO is preferably controlled to obtain a slope of a triangular wave and is frequency modulated to drive the piezoelectric element 4.

The peak height of the triangular wave determines the width of frequency variation of the VCO 22, and the center voltage of the triangular wave determines the center frequency of the CVO 22. A separately-excited oscillator circuit is provided and has the period of the triangular wave as a parameter in addition to the above parameters.

A current in the piezoelectric element 4 is preferably monitored by using the current measurement circuit 24. Fixed parameters of the separately-excited oscillator circuit can be set by using the current signal because the current has the maximum at or around the maximum amount of displacement, which enables atomization. Accordingly, liquid drops are moved and atomized by using parameters optimized in accordance with the volume and the number of liquid drops.

A circuit used to perform a vibration-device driving method according to preferred embodiments of the present invention is not limited, as shown in FIG. 1.

Figure 13:
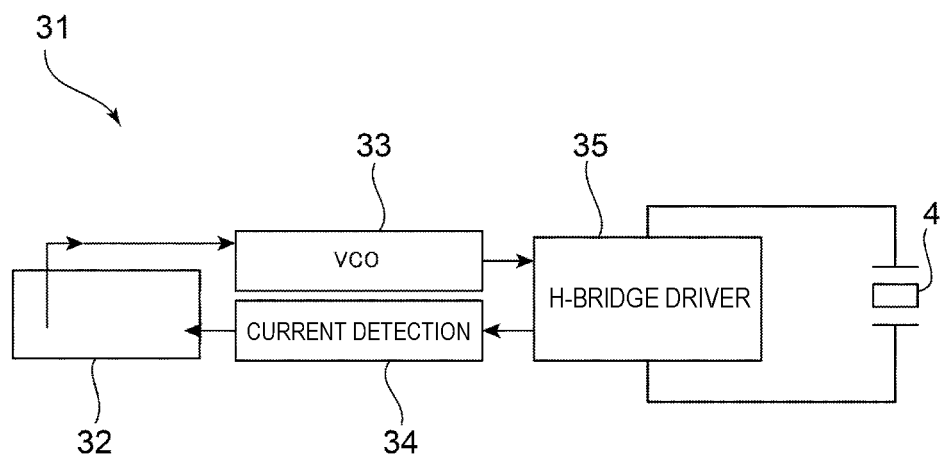
FIG. 13 is a block diagram of a vibration-device driving circuit according to a second preferred embodiment of the present invention.

FIG. 13 is a block diagram showing a driving circuit of a vibration device according to a second preferred embodiment of the present invention. A driving circuit 31 includes a controller 32. The controller 32 is connected to a VCO 33 and a current measurement circuit 34. Similarly to the circuit shown in FIG. 11, the VCO 33 is connected to a H-bridge driver 35. The H-bridge driver 35 drives the piezoelectric element 4. A current flowing through the piezoelectric element 4 is detected using the current measurement circuit 34. The detected current value is supplied to the controller 32.

The controller 32 includes a digital to analog (DA) converter and an analog to digital (AD) converter. The DA converter provides a voltage to control the VCO 33. The AD converter digitizes a current detected by the current measurement circuit 34. In this way, the driving circuit 31 including the controller 32 may be used.

If the controller 32 of this type is used, control can be performed using a method in which a plurality of parameters are adjusted. For example, the following steps can be performed. 1) The frequency is swept in a wide frequency range to detect a peak current. 2) The piezoelectric element 4 is driven a plurality of times in a narrower frequency range around the center frequency at which the current peaks. 3) The first step is repeated, so that the center frequency is corrected. Repeating the above steps ensures atomization of liquid drops.

Atomization is achieved using the separately-excited oscillator circuit described above in the vibration device 1 according to the present preferred embodiment. Consequently, the obstruction of the field of view due to a liquid film formed when a self-excited oscillator circuit is used is reduced or prevented.

A current may be measured using the current measurement circuit 24, or a voltage may be monitored using a feedback electrode.

An example control method in which a control circuit is used to control in one of the vibration-device driving methods according to preferred embodiments of the present invention will be described with reference to FIGS. 14 to 17.

Figure 14:
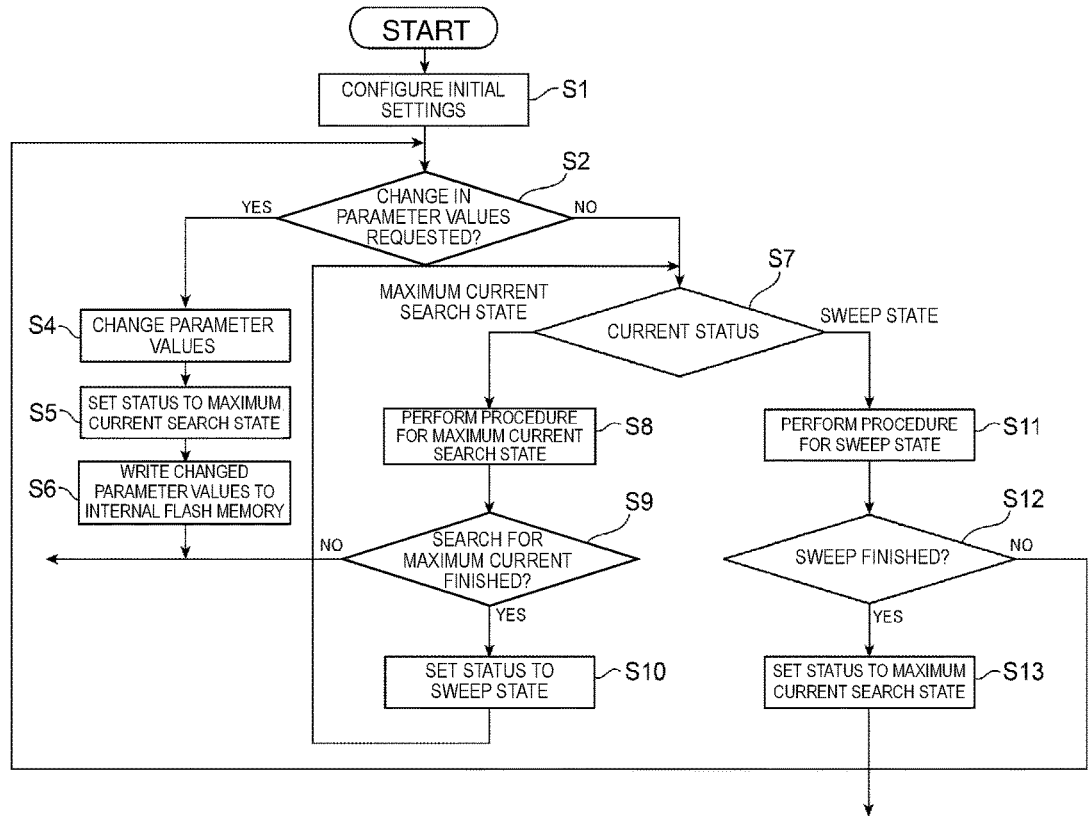
FIG. 14 is a flowchart showing a method of controlling a driving voltage by using a controller.

FIG. 14 is a flowchart showing a driving method according to a third preferred embodiment of the present invention. First, the initial settings are configured in step S1.

Figure 15:
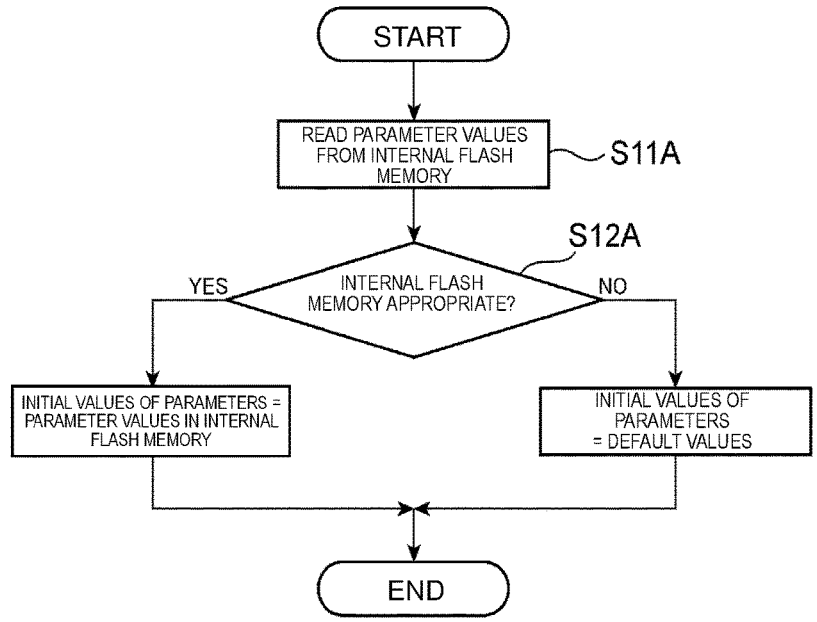
FIG. 15 is a detailed flowchart of a procedure of configuring the initial settings in the flowchart depicted in FIG. 14.

FIG. 15 is a detailed flowchart of step S1, in which the initial settings are configured. As shown in FIG. 15, parameter values are read from an internal memory in step S11A. It is determined in step S12A whether the parameter values in the internal memory are appropriate. If the parameter values are appropriate, initial values of the parameters are set to the parameter values recorded in the internal memory. If the internal memory is not appropriate, predetermined default values are used as the initial values of the parameters. Setting the initial values of the parameters completes the configuration of the initial settings.

Next, as shown in FIG. 14, it is determined in step S2 whether a change in parameter values is requested. If a change is requested, parameter values are changed in step S4. Then, the status is set to a maximum current search state in step S5. Subsequently, the parameter values that have been changed are saved in the internal memory in step S6. The process returns to step S2 again after step S6.

If a change in parameter values is not requested in step S2, the maximum current search state or a sweep state is performed in accordance with the current status in step S7. The procedure for the maximum current search state is performed in step S8.

Figure 16:
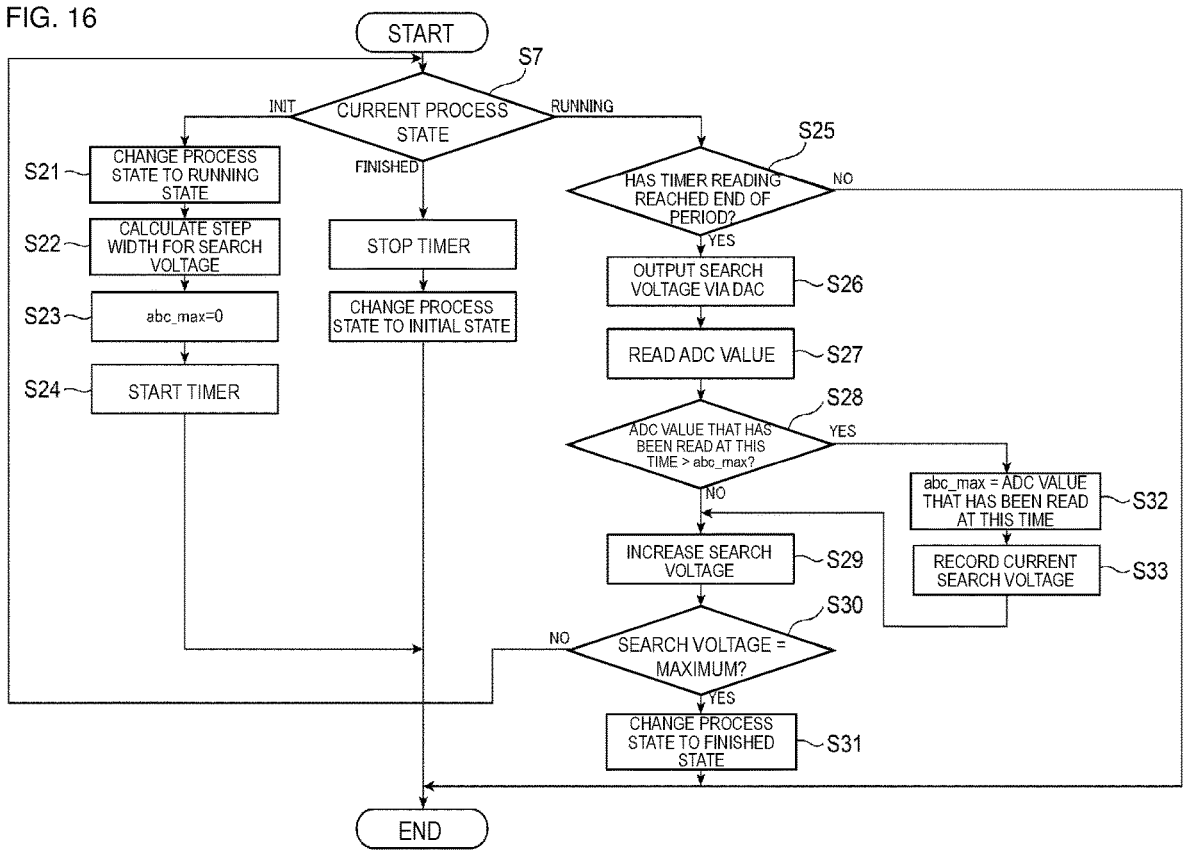
FIG. 16 is a flowchart of a procedure of searching the maximum current in the flowchart depicted in FIG. 14.

FIG. 16 depicts a flowchart of the procedure for the maximum current search state. First, the process state is changed to a running state, a step width is calculated for a search voltage, adc_max is set to 0 ct, and a timer is started in steps S21 to S24 in succession. If it is determined that the process state is the running state in step S7, it is determined in step S25 whether the timer reading has reached the end of a period. If the end of a period has been reached, the search voltage is output in step S26, an output voltage is read in step S27, and it is determined in step S28 whether the voltage that has been read is larger than adc_max. If the voltage that has been read is smaller than adc_max, the search voltage is increased in step S29. It is determined in step S30 whether the search voltage is equal to the maximum. If the search voltage is equal to the maximum, the process state is changed to the finished state in step S31. If the search voltage is not equal to the maximum, the process returns to step S7.

In contrast, if the voltage that has been read is larger than adc_max in step S28, adc_max is set in step S32 to the voltage that has been read. Then, the current search voltage is recorded in step S33.

Referring back to FIG. 14, it is determined in step S9 whether the search for the maximum current is finished. If the search for the maximum current is finished, the status is set to the sweep state in step S10. If the search for the maximum current is not finished in step S9, the process returns to step S2.

Figure 17:
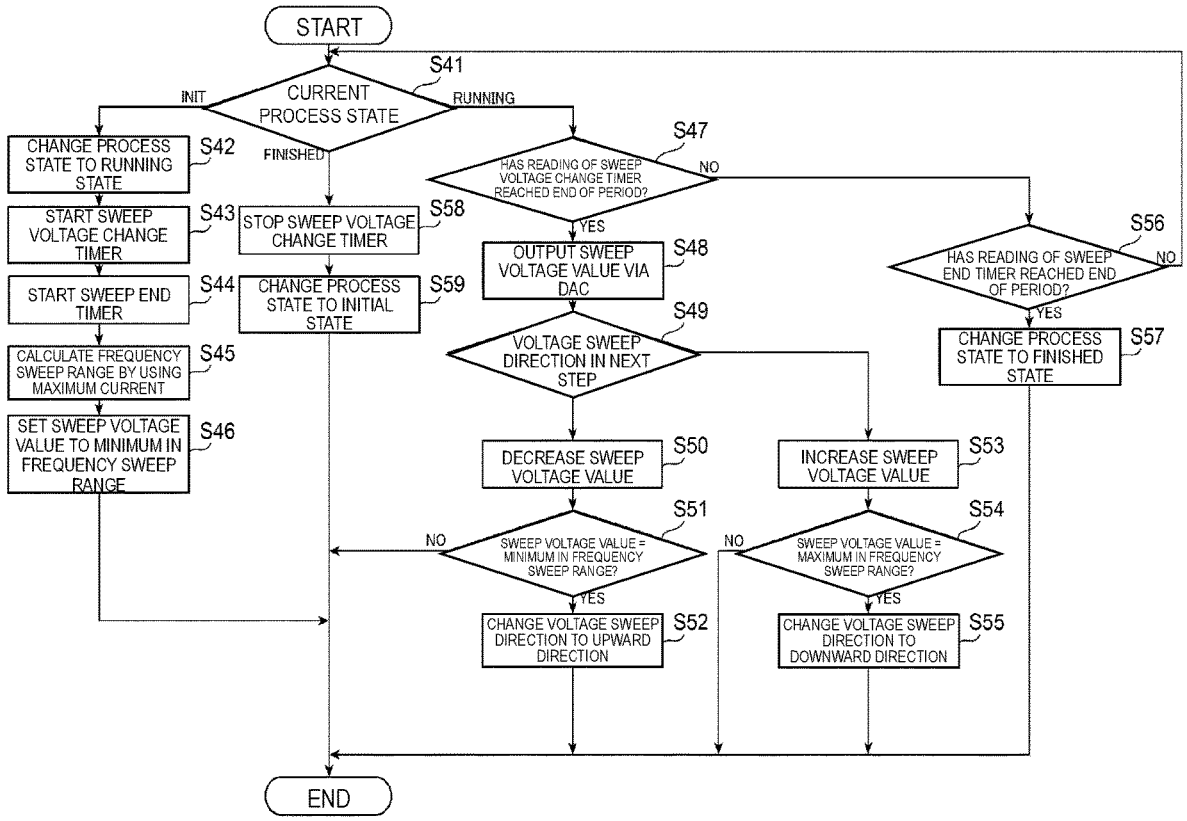
FIG. 17 is a flowchart of a sweep procedure in the flowchart depicted in FIG. 14.

If the current status is the sweep state in step S7, the procedure for the sweep state is performed in step S11. FIG. 17 shows a flowchart of the procedure for the sweep state.

As shown in FIG. 17, if the current process state is the initial state in step S41, the process state is changed to the running state, a sweep voltage change timer is started to operate, and a sweep end timer is started in steps S42 to S44. A frequency sweep range is calculated by using the maximum current in step S45. A sweep voltage value is set to the minimum in the frequency sweep range in step S46. More specifically, the sweep voltage value is set to the value corresponding to the minimum in the frequency sweep range.

If the current process state is the running state in step S41, it is determined in step S47 whether the reading of the sweep voltage change timer has reached the end of a period. If the end of a period has been reached, the sweep voltage value is output in step S48, and the voltage sweep direction in the next step is identified in step S49. If the voltage sweep direction is the direction in which the voltage is decreased, the sweep voltage value is decreased in step S50. Next, it is determined in step S51 whether the sweep voltage value is equal to the minimum in the frequency sweep range. If the sweep voltage value is equal to the minimum, the voltage sweep direction is changed to the upward direction in step S52.

If the voltage sweep direction is the upward direction in step S49, the sweep voltage value is increased in step S53. Next, it is determined in step S54 whether the sweep voltage value is equal to the maximum in the frequency sweep range. If the sweep voltage value is equal to the maximum, the voltage sweep direction is changed to the downward direction in step S55. If the sweep voltage value is not equal to the maximum, the process is finished.

If the reading of the sweep voltage change timer has not reached the end of a period in step S47, it is determined in step S56 whether the reading of the sweep end timer has reached the end of a period. If the end of a period has been reached, the process state is changed to the finished state in step S57, and the process is finished. If the reading of the sweep end timer has not reached the end of a period in step S56, the process returns to step S41.

If the current process state is the finished state in step S41, the sweep voltage change timer is stopped, and the process state is changed to the initial state in steps S58 and S59. Then, the process is finished.

Referring back to FIG. 14, the procedure for the sweep state is performed in step S11. Then, it is determined in step S12 whether the sweep is finished. If the sweep is finished, the status is set to the maximum current search state in step S13. If the sweep is not finished, the process returns to step S2.

The control method described with reference to FIGS. 14 to 17 is only an example control method using the controller in the driving methods according to preferred embodiments of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of driving a vibration device including a light-transmitting body and a piezoelectric element connected to the light-transmitting body to vibrate the light-transmitting body, the method atomizing and removing liquid drops sticking to the light-transmitting body and comprising:
   sweeping a driving voltage to vibrate the piezoelectric element at a sweep speed in a frequency range of about 1 Hz to about 50 Hz so as to sweep a vibration frequency of the piezoelectric element to cover a frequency range including both of a resonant frequency of the light-transmitting body without liquid drops sticking to the light-transmitting body and a resonant frequency of the light-transmitting body with the liquid drops sticking to the light-transmitting body.

2. The method of driving a vibration device according to claim 1, wherein the sweeping in the frequency range includes a step of increasing a sweep voltage and a step of decreasing the sweep voltage after the step of increasing the sweep voltage, and an increase and a decrease in the sweep voltage are performed in a continuous manner.

3. The method of driving a vibration device according claim 1, further comprising:
   a first step in which the piezoelectric element is driven so as to atomize liquid drops sticking to the light-transmitting body;
   a second step in which the light-transmitting body is caused to vibrate more weakly than in the first step or caused to stop vibrating; and
   a third step, which follows the second step, to atomize liquid drops sticking to the light-transmitting body are performed by the sweeping in the frequency range.

4. A vibration device comprising:
   a light-transmitting body;
   a piezoelectric element that is connected to the light-transmitting body and that vibrates the light-transmitting body; and
   a control circuit that is electrically connected to the piezoelectric element and that sweeps at a speed in a range of about 1 Hz to about 50 Hz a driving voltage to vibrate the piezoelectric element so as to sweep a vibration frequency of the piezoelectric element to cover a frequency range including a resonant frequency of the light-transmitting body and a resonant frequency of the light-transmitting body with liquid drops sticking to the light-transmitting body.

5. The vibration device according to claim 4, further comprising:
   a hollow cylindrical body connecting the light-transmitting body to the piezoelectric element; wherein
   the piezoelectric element has a ring shape;
   the piezoelectric element is fixed to one end of the hollow cylindrical body; and
   the light-transmitting body is fixed to another end of the hollow cylindrical body.

6. The vibration device according to claim 4, wherein the light-transmitting body has a plate shape.

7. The vibration device according to claim 4, wherein the light transmitting body is made of a translucent or transparent material.

8. The vibration device according to claim 7, wherein the translucent or transparent material is resin or glass.

9. The vibration device according to claim 5, wherein the light transmitting body is fixed to the hollow cylindrical body by a bonding agent layer.

10. The vibration device according to claim 4, wherein the piezoelectric element has a ring shape.

11. The vibration device according to claim 4, wherein the piezoelectric element includes a ring-shaped piezoelectric member made of a piezoelectric ceramics.

12. The vibration device according to claim 11, wherein a first electrode is disposed on one surface of the ring-shaped piezoelectric member and a second electrode is disposed on another surface of the ring-shaped piezoelectric member.

13. The vibration device according to claim 12, wherein the first electrode includes cutouts facing an inner perimeter of the ring-shaped piezoelectric member.

14. The vibration device according to claim 13, wherein a third electrode is disposed in each of the cutouts.

15. The vibration device according to claim 14, wherein each of the third electrodes is electrically connected to the second electrode via a portion of the inner perimeter of the ring-shaped piezoelectric member.

* * * * *